United States Patent
Pan et al.

(10) Patent No.: US 7,363,458 B2
(45) Date of Patent: Apr. 22, 2008

(54) COMPUTER PLATFORM MEMORY CONFIGURATION ON-BOARD INDICATING METHOD AND SYSTEM

(75) Inventors: Chin-Fong Pan, Taipei (TW); Wh Shih, Taipei (TW)

(73) Assignee: Inventec Corporation, Shih-Lin District, Taipei (TW)

( * ) Notice: Subject to any disclaimer, the term of this patent is extended or adjusted under 35 U.S.C. 154(b) by 233 days.

(21) Appl. No.: 11/394,275

(22) Filed: Mar. 29, 2006

(65) Prior Publication Data

US 2007/0118714 A1 May 24, 2007

(30) Foreign Application Priority Data

Nov. 18, 2005 (TW) ............................... 94140535 A

(51) Int. Cl.
*G06F 12/00* (2006.01)
(52) U.S. Cl. .......................................... 711/170; 711/5
(58) Field of Classification Search ..................... None
See application file for complete search history.

(56) References Cited

U.S. PATENT DOCUMENTS 7,308,527 B2 * 12/2007 Rippens et al. ............. 711/104

* cited by examiner

*Primary Examiner*—Donald Sparks
*Assistant Examiner*—Mehdi Namazi
(74) *Attorney, Agent, or Firm*—Foley & Lardner LLP

(57) ABSTRACT

A computer platform memory configuration on-board indicating method and system is proposed, which is designed for use with a computer platform, such as a network server, for providing a memory configuration on-board indicating function; and which is characterized by the capability of reading a set of embedded memory specification data from all the memory modules, then using the memory specification data to automatically set up a configuration scheme for these memory modules, and subsequently using the memory configuration data to correspondingly generate a set of light signals in a predefined pattern to indicate the current memory configuration of the network server. This feature allows network system management personnel to conveniently and quickly learn the current memory configuration of the network server simply by visually checking the pattern of the light signals on the system motherboard of the network server.

9 Claims, 3 Drawing Sheets

COMPUTER PLATFORM MEMORY CONFIGURATION ON-BOARD INDICATING METHOD AND SYSTEM

BACKGROUND OF THE INVENTION

1. Field of the Invention

This invention relates to information technology (IT), and more particularly, to a computer platform memory configuration on-board indicating method and system which is designed for use in conjunction with a computer platform, such as a network server, for providing the network server with a memory configuration on-board indicating function that allows the current memory configuration of the network server to be automatically indicated through light-emitting means on the circuit board (i.e., system motherboard of the network server) where the memory modules of the network server are installed.

2. Description of Related Art

A network server is a centralized host computer that is linked to a network and capable of providing network-based data services via the network to one or more client stations. In the application of enterprise-class network servers, since these servers are used to handle extremely huge amounts of data, there is a standardized specification called RAS, which stands for Reliability, Accessibility, and Serviceability, for the design and manufacture of enterprise-class network servers. The RAS specification stipulates that an enterprise-class network server should have high level of reliability during operation, high level of accessibility for the clients, and high level of serviceability to serve the clients.

To meet the RAS requirements, enterprise-class network servers are customarily equipped with high-capacity memory modules, which are configured to provide various backup capabilities, such as mirroring and redundancy, and various high-speed access modes, such as dual-channel access mode and single-channel access mode. In practical implementation, enterprise-class network servers typically utilize DIMM (Dual Inline Memory Module) as primary memory.

Since an enterprise-class network server is typically installed with a large number of DIMM modules which might be set to different operating modes, the overall memory configuration of these DIMM modules would be highly complicated. This situation would make the network system management personnel hard to learn the current operating mode or status of each of the multiple DIMM modules installed on the network server; i.e., whether a particular DIMM module is enabled, disabled, or failed. If the network system management personnel is unaware of the memory configuration of a network server, the management personnel would be unable to manage the network server effectively.

SUMMARY OF THE INVENTION

It is therefore an objective of this invention to provide a computer platform memory configuration on-board indicating method and system which is capable of allowing the network system management personnel of a network server to learn the current memory configuration of the network server directly from system motherboard of the network server where the memory modules of the network server are installed.

The computer platform memory configuration on-board indicating method and system according to the invention is designed for use in conjunction with a computer platform, such as a network server, for providing the network server with a memory configuration on-board indicating function that allows the current memory configuration of the network server to be automatically indicated through light-emitting means on the circuit board (i.e., system motherboard of the network server) where the memory modules of the network server are installed.

The computer platform memory configuration on-board indicating method according to the invention comprises: (1) responding to a startup event on the computer platform by reading a set of memory embedded specification data from the memory modules; (2) setting up a configuration scheme for the memory modules based on the memory embedded specification data retrieved from the memory modules, and generating a collection of memory configuration data based on the current configuration of the memory modules; (3) generating a set of display driving signals corresponding to the memory configuration data; and (4) generating a predefined pattern of lighting that indicates the current memory configuration of each of the memory modules installed on the computer platform.

In architecture, the computer platform memory configuration on-board indicating system according to the invention comprises: (A) a memory embedded specification data reading module, which is capable of responding to a startup event on the computer platform by reading a set of memory embedded specification data from the memory modules; (B) a memory configuration setting module, which is capable of setting up a configuration scheme for the memory modules based on the memory embedded specification data retrieved from the memory modules by the memory embedded specification data reading module, and further capable of generating a collection of memory configuration data based on the current configuration of the memory modules; (C) a display driving module, which is capable of generating a set of display driving signals corresponding to the memory configuration data generated by memory configuration setting module; and (D) a light-emitting display module, which is composed of a group of lighting-emitting units respectively associated with the memory modules, and which is capable of being driven by the display driving signal from the display driving module to activate the lighting-emitting units to generate a predefined pattern of lighting that indicates the current memory configuration of each of the memory modules installed on the computer platform.

The computer platform memory configuration on-board indicating method and system according to the invention is characterized by the capability of reading a set of embedded memory specification data (such DIMM SPD data) from all the DIMM modules currently installed on the network server, then using these memory specification data to automatically set up a suitable configuration for these memory modules, and subsequently using the memory configuration data to correspondingly generate a set of light signals in a predefined pattern to indicate the current memory configuration of the network server. This feature allows network system management personnel to conveniently and quickly learn the current memory configuration of the network server simply by visually checking the pattern of the light signals emitted from a light-emitting display module mounted on the system motherboard of the network server.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The computer platform memory configuration on-board indicating method and system according to the invention is disclosed in full details by way of preferred embodiments in the following with reference to the accompanying drawings.

Figure 1:
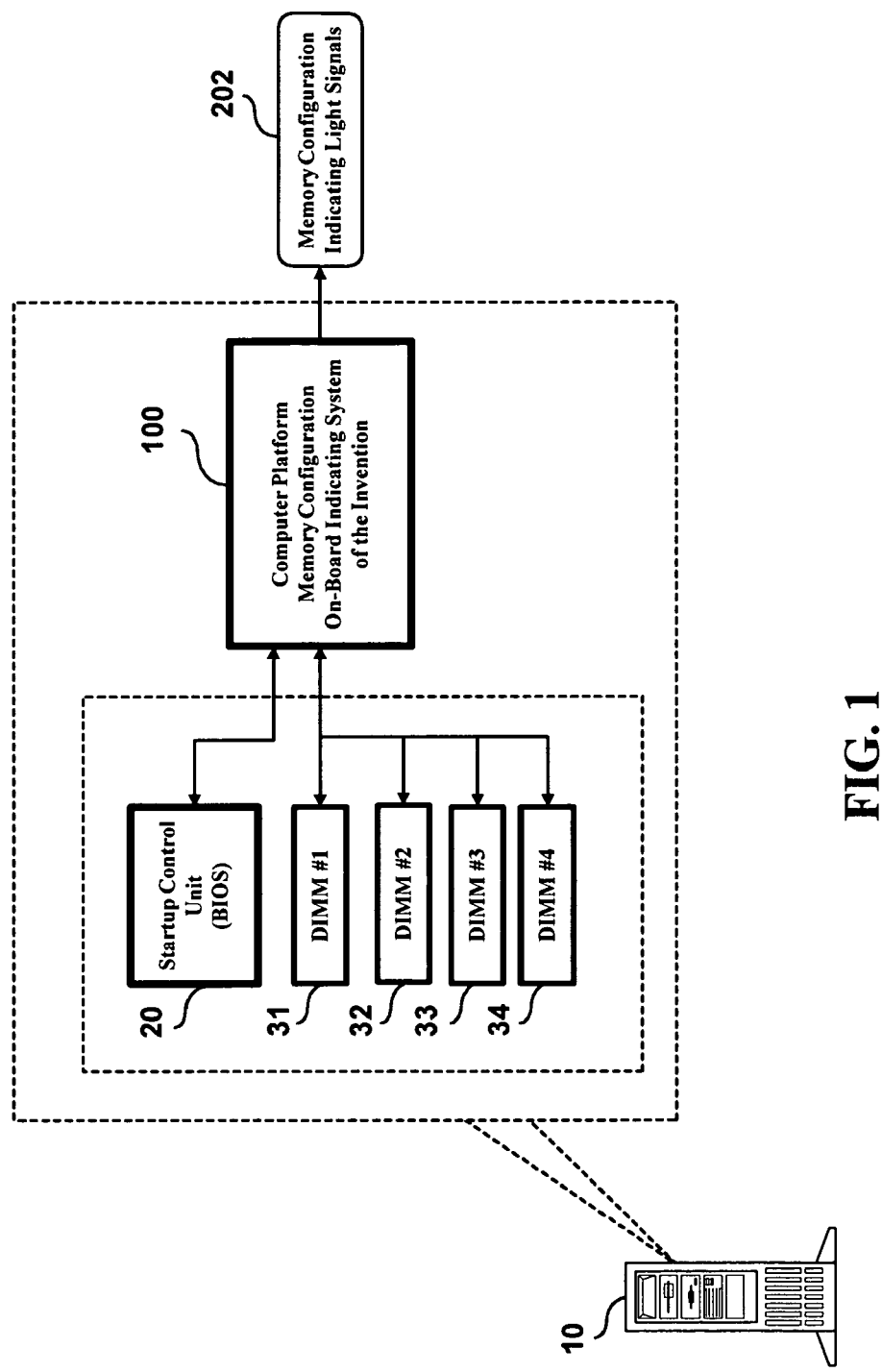
FIG. 1 is a schematic diagram showing the application of the computer platform memory configuration on-board indicating system according to the invention.

FIG. 1 is a schematic diagram showing the application of the computer platform memory configuration on-board indicating system according to the invention (shown as a box indicated by the reference numeral 100), which is designed for use in conjunction with a computer platform, such as a network server 10, particularly an enterprise-class network server, that is equipped with a startup control unit, such as a BIOS (Basic Input/Output System) module 20, and a cluster of memory modules 31, 32, 33, 34, such as DIMM (Dual Inline Memory Module) units (note that in the example shown in FIG. 1, only 4 DIMM units are shown for demonstrative purpose; but in practice, the number of DIMM units is unrestricted). Further, for simplification of drawings, FIG. 1 shows only those hardware components that are related to the invention.

In actual operation, the computer platform memory configuration on-board indicating system of the invention 100 is capable of providing a memory configuration on-board indicating function that allows the current memory configuration of the network server 10 to be automatically indicated through a set of light signals (hereinafter referred to as memory configuration indicating light signals) 202 that are displayed on the circuit board (i.e., system motherboard of the network server 10) where the DIMM unit 31, 32, 33, 34 are mounted. By visually checking the memory configuration indicating light signals 202, the network system management personnel will be able to learn the current configuration of the DIMM unit 31, 32, 33, 34 installed on the network server 10.

Figure 2:
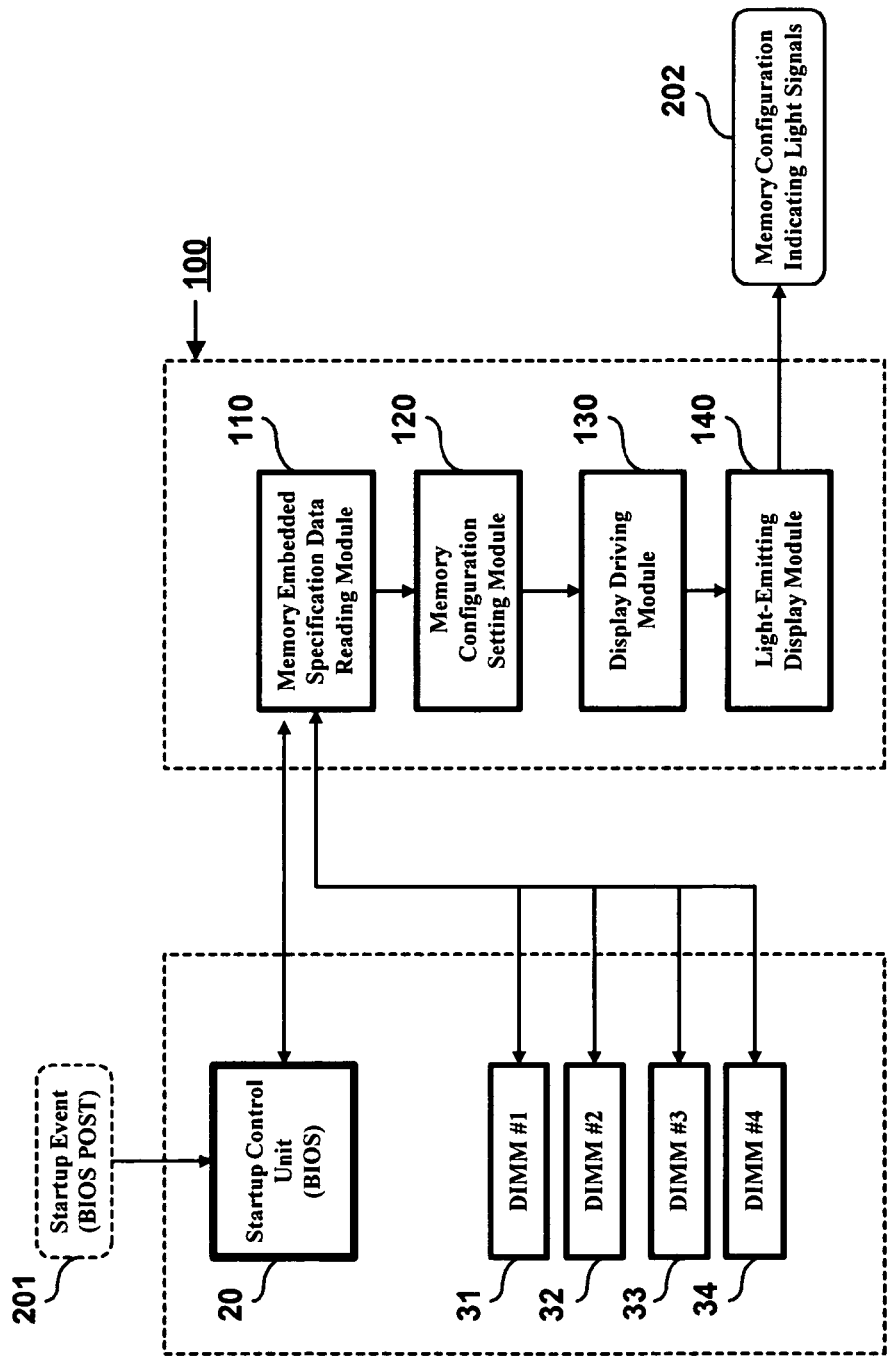
FIG. 2 is a schematic diagram showing the object-oriented component model of the computer platform memory configuration on-board indicating system of the invention.

As shown in FIG. 2, in architecture, the computer platform memory configuration on-board indicating system of the invention 100 is based on an object-oriented component model which comprises: (A) a memory embedded specification data reading module 110; (B) a memory configuration setting module 120; (C) a display driving module 130; and (D) a light-emitting display module 140. In practical implementation, the memory embedded specification data reading module 110, the memory configuration setting module 120, and the display driving module 130 can be realized by firmware-based computer code and integrated as an add-on module to the BIOS module 20 on the network server 10, while the light-emitting display module 140 is a hardware component for installation on the system motherboard (not shown) of the network server 10.

Firstly, the respective attributes and behaviors of the constituent modules 110, 120, 130, 140 of the computer platform memory configuration on-board indicating system of the invention 100 are described in details in the following.

The memory embedded specification data reading module 110 is capable of being activated in response to a startup event 201 on the network server 10, i.e., when the BIOS unit 20 is performing a POST (Power On Self Test) procedure after the network server 10 is powered on, and which is capable of responding to the startup event 201 by reading a set of memory specification data that is pre-embedded in each of the DIMM unit 31, 32, 33, 34 installed on the network server 10. In practice, standard DIMM units are internally provided with a memory specification data storage area called SPD (Serial Presence Detect) for storing a set of memory specification data about the associated DIMM unit, such as memory capacity, operating frequency, serial number, manufacturer, and so on. Therefore, the memory embedded specification data reading module 110 is designed to gain access to the embedded SPD data in the DIMM unit 31, 32, 33, 34 to learn the specification of each of the DIMM unit 31, 32, 33, 34.

The memory configuration setting module 120 is capable of setting up a system configuration for the DIMM unit 31, 32, 33, 34 based on the SPD memory specification data retrieved from these DIMM unit 31, 32, 33, 34 by the memory embedded specification data reading module 110. Based on the required memory capacity of the network server 10 and the SPD data, the memory configuration setting module 120 will perform a series of memory configuring tasks, such as automatically setting the DIMM unit 31, 32, 33, 34 to operate in either single-channel access mode, dual-channel access mode, mirror mode, or backup mode; finding each failed DIMM module (if any) and setting each failed DIMM module to failure mode; setting each surplus DIMM module (if any, in the case that the total capacity of the DIMM unit 31, 32, 33, 34 exceeds required capacity) to disabled mode; and so on. After the configuration is completed, the memory configuration setting module 120 will collect and store all the related parameters and data about the memory configuration in a data collection named, for example, by HOST_MEMORY_CONFIG_DATA.

The display driving module 130 is capable of generating a corresponding set of display driving signals based on the HOST_MEMORY_CONFIG_DATA memory configuration data generated by the memory configuration setting module 120. In practical implementation, for example, the display driving signals can be ON/OFF switching signals that can be used to control the light-emitting display module 140 to generate a predefined pattern of lighting to indicate the configuration of the DIMM unit 31, 32, 33, 34.

Figure 3:
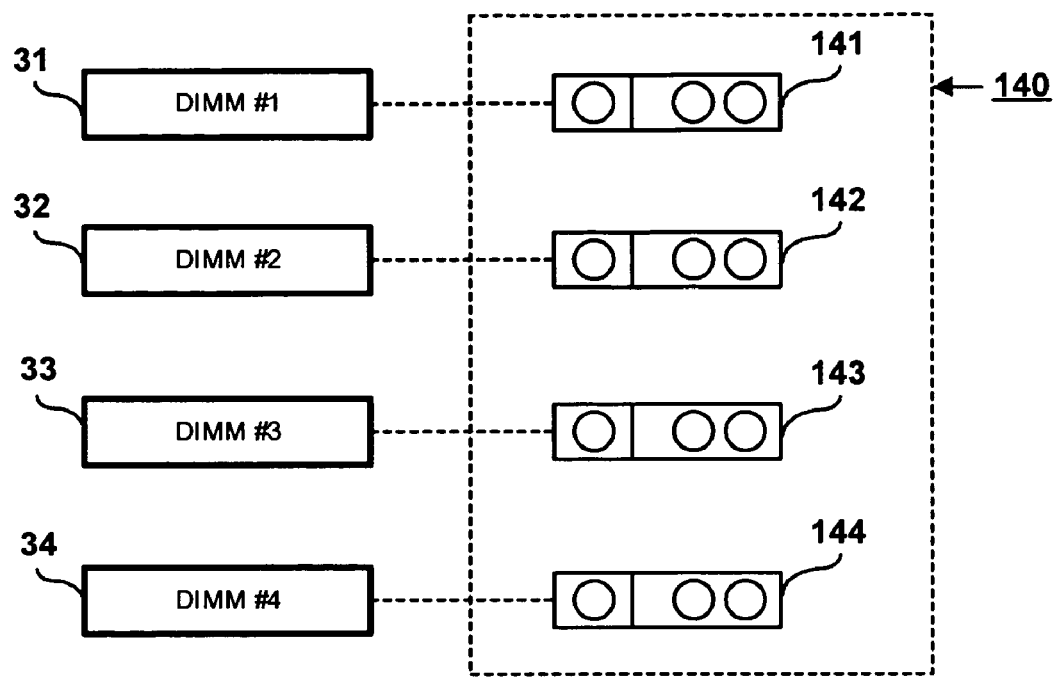
FIG. 3 is a schematic diagram showing a preferred embodiment of an light-emitting display module utilized by the computer platform memory configuration on-board indicating system of the invention.
Figure 4:
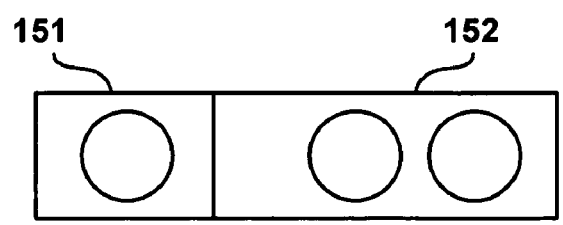
FIG. 4 is a schematic diagram showing the structure of a single lighting-emitting unit in the light-emitting display module shown in FIG. 3.

The light-emitting display module 140, as shown in FIG. 3, is composed of a group of lighting-emitting units 141, 142, 143, 144 respectively associated with the DIMM unit 31, 32, 33, 34. In practical implementation, for example, these lighting-emitting units 141, 142, 143, 144 can be mounted beside the DIMM unit 31, 32, 33, 34 on the system motherboard (not shown) of the network server 10, or alternatively mounted on an external control panel (not shown). In operation, these lighting-emitting units 141, 142, 143, 144 are capable of being driven by the display driving signal from the display driving module 130 to generate a predefined pattern of lighting that indicates the current memory configuration (i.e., current operating mode and state) of each of the DIMM unit 31, 32, 33, 34. As shown in FIG. 4, each of the lighting-emitting units 141, 142, 143, 144 shown in FIG. 3 can be realized in such a manner as to incorporate a first lamp set 151 and a second lamp set 152, where the first lamp set 151 includes just one dual-color LED (Light-Emitting Diode), such as a green/read dual-color LED, and this green/read dual-color LED can be lighted in 3 different ways to represent 3 different memory configuration schemes, as depicted in the following:

[Green]: indicates that the associated DIMM unit is usable and set to enabled state;

[Red]: indicates that the associated DIMM unit is unusable and set to failed state;

[Unlighted]: indicates that the associated DIMM unit is set to disabled state.

On the other hand, the second lamp set 152 includes a pair of single-color LED, such as a pair of green LEDs, and these two green LEDs can be turned on or off in 4 different ways to represent 4 different memory configuration schemes, as depicted in the following (note that "1" represents lighted up, while "0" represents unlighted):

[00]: indicates that the associated DIMM unit is set to single-channel access mode;

[01]: indicates that the associated DIMM unit is set to dual-channel access mode;

[10]: indicates that the associated DIMM unit is set to backup mode;

[11]: indicates that the associated DIMM unit is set to mirroring mode.

It is to be noted that the mapping of different configuration schemes to different patterns of lighting emitted from the lighting-emitting units 141, 142, 143, 144 is an arbitrary design choice, which can be realized in various different other ways to indicate the various different configuration schemes of the DIMM unit 31, 32, 33, 34.

The following is a detailed description of a practical example of the application of the computer platform memory configuration on-board indicating system of the invention 100 during actual operation.

Referring to FIG. 1 through FIG. 4, in actual operation, when the network server 10 is powered on and undergoes a booting process (i.e., when a startup event 201 occurs on the network server 10), it will cause the computer platform memory configuration on-board indicating system of the invention 100 to start to function by first activating the memory embedded specification data reading module 110 to read a set of pre-embedded memory specification data, i.e., SPD data, in each of the DIMM unit 31, 32, 33, 34 installed on the network server 10. Next, based on the required memory capacity of the network server 10 and the SPD data, the memory configuration setting module 120 will perform a series of memory configuring tasks as automatically setting the DIMM unit 31, 32, 33, 34 to operate in either single-channel access mode, dual-channel access mode, mirror mode, or backup mode; finding each failed DIMM module (if any) and setting each failed DIMM module to failure mode; setting each surplus DIMM module (if any, in the case that the total capacity of the DIMM unit 31, 32, 33, 34 exceeds required capacity) to disabled mode; and so on. After the configuration setup is completed, the memory configuration setting module 120 will store the configuration data in a data collection named by HOST_MEMORY_CONFIG_DATA. Next, the display driving module 130 is activated to generate a corresponding set of display driving signals based on the HOST_MEMORY_CONFIG_DATA memory configuration data from the memory configuration setting module 120. These display driving signals are then used to drive the light-emitting display module 140 to light up the first lamp set 151 and the second lamp set 152 of each of the lighting-emitting units 141, 142, 143, 144 in a predefined manner to indicate the current configuration of the DIMM unit 31, 32, 33, 34. For example, if the first DIMM unit 31 is set to enabled state and operate in dual-channel access mode, then the first lamp set 151 of its associated lighting-emitting unit 141 will be activated to emit green light to indicate that the first DIMM unit 31 is currently enabled, and meanwhile the second lamp set 152 is activated to display a pattern of lighting that represents [01] to indicate that the first DIMM unit 31 is currently operating in dual-channel access mode.

In conclusion, the invention provides a computer platform memory configuration on-board indicating method and system which is designed for use with a computer platform, such as a network server, for providing a memory configuration on-board indicating function; and which is characterized by the capability of reading a set of embedded memory specification data (such DIMM SPD data) from all the DIMM modules currently installed on the network server, then using these memory specification data to automatically set up a suitable configuration for these memory modules, and subsequently using the memory configuration data to correspondingly generate a set of light signals in a predefined pattern to indicate the current memory configuration of the network server. This feature allows network system management personnel to conveniently and quickly learn the current memory configuration of the network server simply by visually checking the pattern of the light signals emitted from a light-emitting display module mounted on the system motherboard of the network server. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A computer platform memory configuration on-board indicating method for use on a computer platform equipped with a group of memory modules for providing a memory configuration on-board indicating function, which comprises:

responding to a startup event on the computer platform by reading a set of memory embedded specification data from the memory modules;

setting up a configuration scheme for the memory modules based on the memory embedded specification data retrieved from the memory modules, and generating a collection of memory configuration data based on the current configuration of the memory modules;

generating a set of display driving signals corresponding to the memory configuration data; and generating a predefined pattern of lighting that indicates the current memory configuration of each of the memory modules installed on the computer platform.

2. The computer platform memory configuration on-board indicating method as recited in claim 1, wherein the computer platform is a network server.

3. The computer platform memory configuration on-board indicating method as recited in claim 1, wherein the startup event include a BIOS (Basic Input/Output System) module.

4. The computer platform memory configuration on-board indicating method as recited in claim 1, wherein the memory modules are each a DIMM (Dual Inline Memory Module) unit.

5. A computer platform memory configuration on-board indicating system for use with a computer platform equipped with a group of memory modules for providing a memory configuration on-board indicating function, which comprises:
- a memory embedded specification data reading module, which is capable of responding to a startup event on the computer platform by reading a set of memory embedded specification data from the memory modules;
- a memory configuration setting module, which is capable of setting up a configuration scheme for the memory modules based on the memory embedded specification data retrieved from the memory modules by the memory embedded specification data reading module, and further capable of generating a collection of memory configuration data based on the current configuration of the memory modules;
- a display driving module, which is capable of generating a set of display driving signals corresponding to the memory configuration data generated by memory configuration setting module; and
- a light-emitting display module, which is composed of a group of lighting-emitting units respectively associated with the memory modules, and which is capable of being driven by the display driving signal from the display driving module to activate the lighting-emitting units to generate a predefined pattern of lighting that indicates the current memory configuration of each of the memory modules installed on the computer platform.

6. The computer platform memory configuration on-board indicating system as recited in claim 1, wherein the computer platform is a network server.

7. The computer platform memory configuration on-board indicating system as recited in claim 1, wherein the startup event is a BIOS (Basic Input/Output System) module.

8. The computer platform memory configuration on-board indicating system as recited in claim 1, wherein the memory modules are each a DIMM (Dual Inline Memory Module) unit.

9. The computer platform memory configuration on-board indicating system as recited in claim 1, wherein the lighting-emitting units in the light-emitting display module each includes a lined array of light-emitting diodes for emitting a predetermined pattern of lighting indicative of the memory configuration of the memory modules on the computer platform.

* * * * *